(12) United States Patent
Gebbeken et al.

(10) Patent No.: US 9,510,501 B2
(45) Date of Patent: Dec. 6, 2016

(54) DISPENSING SYSTEM FOR AN AGRICULTURAL SPREADER MACHINE

(71) Applicant: LEMKEN GmbH & Co. KG, Alpen (DE)

(72) Inventors: Martin Gebbeken, Alpen (DE); Christian Paessens, Issum (DE); Dieter Werries, Alpen (DE); Thomas Lukas, Ahaus Wüllen (DE); Mark Berendsen, AJ Lengel (NL); Marcel Geraats, Nettetal (DE); Christian Gotzen, Viersen (DE)

(73) Assignee: LEMKEN GmbH & Co. KG, Alpen (DE)

( * ) Notice: Subject to any disclaimer, the term of this patent is extended or adjusted under 35 U.S.C. 154(b) by 0 days.

(21) Appl. No.: 15/027,051

(22) PCT Filed: Sep. 26, 2014

(86) PCT No.: PCT/DE2014/100344
§ 371 (c)(1),
(2) Date: Apr. 4, 2016

(87) PCT Pub. No.: WO2015/048943
PCT Pub. Date: Apr. 9, 2015

(65) Prior Publication Data
US 2016/0234998 A1 Aug. 18, 2016

(30) Foreign Application Priority Data
Oct. 2, 2013 (DE) .................. 10 2013 110 991

(51) Int. Cl.
*B65G 53/46* (2006.01)
*A01C 7/12* (2006.01)
(Continued)

(52) U.S. Cl.
CPC ............... *A01C 7/127* (2013.01); *A01C 7/082* (2013.01); *B65G 53/06* (2013.01);
(Continued)

(58) Field of Classification Search
CPC . B65G 53/46; B65G 53/4615; B65G 53/4683; B65D 90/626
(Continued)

(56) References Cited

U.S. PATENT DOCUMENTS

| | | | |
|---|---|---|---|
| 270,198 A | 1/1883 | Aumock | |
| 3,710,980 A * | 1/1973 | Henry | .................. B65B 1/36 222/267 |

(Continued)

FOREIGN PATENT DOCUMENTS

| | | |
|---|---|---|
| DE | 807722 C | 7/1951 |
| DE | 74138 | 11/1969 |

(Continued)

*Primary Examiner* — Joseph Dillon, Jr.
(74) *Attorney, Agent, or Firm* — James Creighton Wray; Meera P. Narasimhan

(57) ABSTRACT

A metering system is proposed for an agricultural distributor for dispensing granular or granulated material with which a vertical cell wheel arrangement in combination with an adjustable cell wheel floor achieves great variability of the adjustable metering volumes with reduced drive energy requirement.

16 Claims, 4 Drawing Sheets

(51) Int. Cl.
*G01F 11/10* (2006.01)
*B65G 53/06* (2006.01)
*B65G 53/66* (2006.01)
*A01C 7/08* (2006.01)

(52) U.S. Cl.
CPC ......... *B65G 53/4616* (2013.01); *B65G 53/66* (2013.01); *G01F 11/10* (2013.01); *B65G 2201/042* (2013.01)

(58) Field of Classification Search
USPC .... 406/66, 67, 132, 135, 144, 181; 222/368, 222/370, 630, 636; 111/174, 175
See application file for complete search history.

(56) References Cited

U.S. PATENT DOCUMENTS

| | | | | | |
|---|---|---|---|---|---|
| 3,785,529 | A * | 1/1974 | Dumbaugh | ............ | B65G 65/44 222/161 |
| 4,071,170 | A * | 1/1978 | Gunzel, Jr. | ......... | A01M 9/0046 222/199 |
| 4,152,843 | A * | 5/1979 | Kemmetmueller | ..... | C10B 39/02 239/456 |
| 4,167,248 | A * | 9/1979 | Akazawa | ............... | A01C 17/00 222/227 |
| 4,361,254 | A * | 11/1982 | Teraoku | ................. | B65D 88/28 141/331 |
| 4,597,134 | A * | 7/1986 | Wagner | ................ | A22C 7/0092 222/404 |
| 5,071,289 | A * | 12/1991 | Spivak | ................... | B65G 53/22 406/11 |
| 5,615,670 | A * | 4/1997 | Rhodes | ............ | A61M 15/0065 128/203.15 |
| 5,709,322 | A * | 1/1998 | Ricciardi | ............. | G01F 13/005 222/227 |
| 5,960,990 | A * | 10/1999 | Radosevich | ........... | B65D 88/66 222/1 |
| 6,079,911 | A * | 6/2000 | Wangermann | ...... | A01M 7/0092 406/122 |
| 6,116,471 | A * | 9/2000 | Miller | .................. | A01K 5/0225 119/53 |
| 6,379,086 | B1 * | 4/2002 | Goth | ........................ | B29C 47/10 406/130 |
| 6,491,070 | B1 * | 12/2002 | Espina Frutos | ........ | B01D 45/00 141/285 |
| 6,662,953 | B1 * | 12/2003 | Rouse | .................... | B65D 88/70 209/682 |
| 8,936,416 | B2 * | 1/2015 | Stutz, Jr. | ................ | B65G 53/40 222/400.5 |
| 2002/0134796 | A1 * | 9/2002 | Nussbaumer | .......... | B65D 88/66 222/200 |
| 2004/0009015 | A1 * | 1/2004 | Fujimori | ............. | G03G 15/0848 399/258 |
| 2006/0024091 | A1 * | 2/2006 | Wegman | ............ | G03G 15/0855 399/262 |
| 2011/0036870 | A1 * | 2/2011 | Luchinger | ............. | G01F 13/005 222/252 |
| 2014/0328636 | A1 * | 11/2014 | Stutz, Jr. | ................ | B65G 53/40 406/128 |
| 2016/0184830 | A1 * | 6/2016 | Misumi | ..................... | B02C 7/12 99/286 |

FOREIGN PATENT DOCUMENTS

| | | |
|---|---|---|
| DE | 1946213 A1 | 3/1971 |
| DE | 3425895 A1 | 2/1985 |
| DE | 3544014 A1 | 2/1987 |
| DE | 19541397 A1 | 7/1997 |
| DE | 102005052741 A1 | 5/2007 |
| DE | 102006056256 A1 | 5/2008 |
| EP | 0358878 A2 | 3/1990 |
| WO | 9812512 A1 | 3/1998 |

* cited by examiner

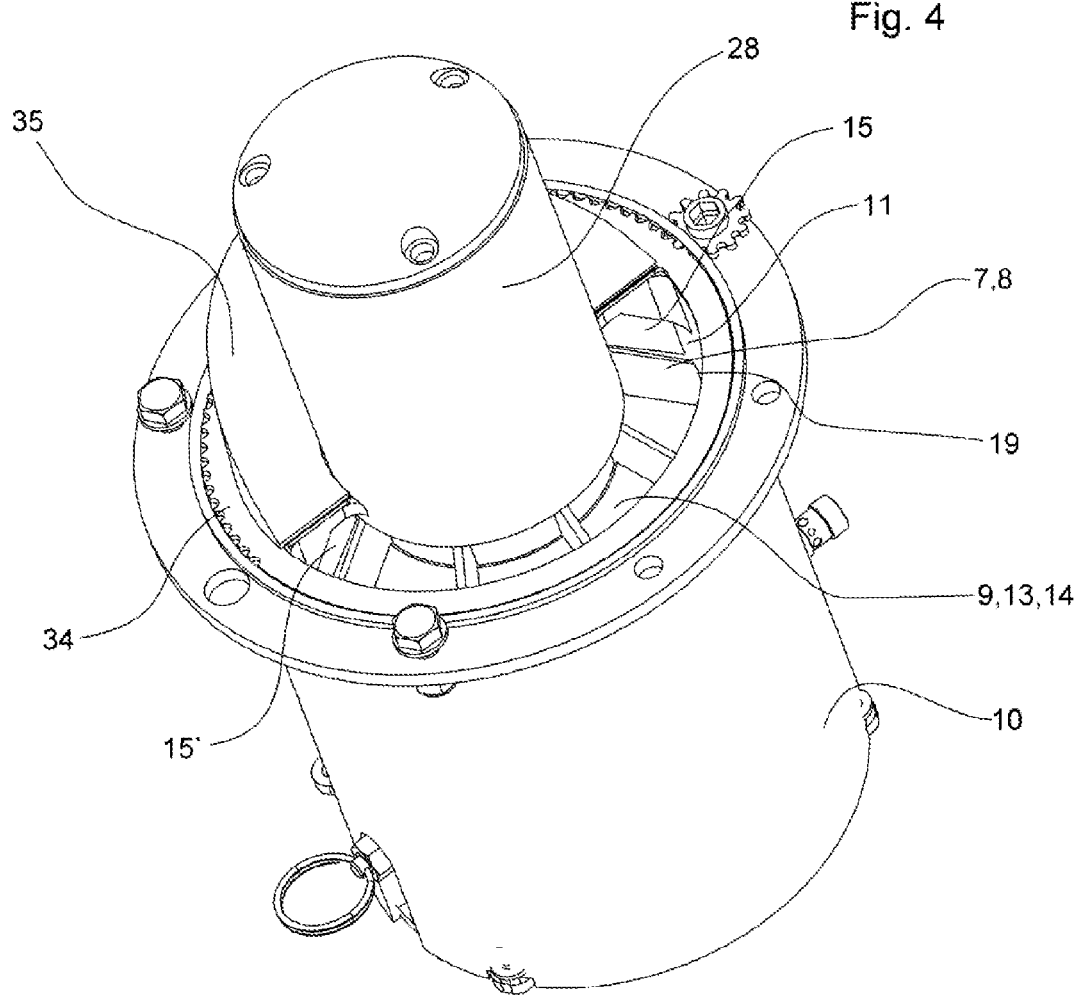

DISPENSING SYSTEM FOR AN AGRICULTURAL SPREADER MACHINE

This application claims the benefit of German Application No. 10 2013 110 991.8 filed Oct. 2, 2013, and PCT/DE2014/100344 filed Sep. 26, 2014, International Publication No. WO 2015/048943 A1, which are hereby incorporated by reference in their entirety as if fully set forth herein.

The invention concerns a metering system for an agricultural distributor.

A metering system of this kind for an agricultural distributor is described for example in German patent specification DE 1 946 213 B2 or in the European patent application EP 358 878 A2. The metering system consists of a housing and a horizontal cell wheel. The material to be metered runs radially from above into the cell chambers and is passed in the bottom section of the cell wheel into a pneumatic conveyor system. Through the rotation of the cell wheel, the material sliding from above through the force of gravity is compacted further against the housing wall up to the discharge opening. This creates a higher drive torque of the cell wheel, which increases still further if tapered bottom flaps are used. In addition, metering accuracy suffers from the varying compaction of the material. EP 1 530 891 also described a device with a radially filled cell wheel, in which the cell volume is changed laterally by means of variably retractable wedges. To change the cell chamber volume, the cell wheel can be extended by a cylindrical, smooth section, whereby the cell wheel can then be slid laterally into the metering unit. This is shown, for example, in patent specification DD 74 138 A1. In addition, cell wheels are familiar in which laterally inserted filling materials reduce the cell chamber volume. For example, the first publication of German patent DE 10 2006 056 256 deals with a metering device of this kind. A vertical or obliquely rotating metering cylinder is presented in the first publication of German patent DE 19 541 397 A1 that is designed with axial transport grooves of different sizes and is moved in a granulate supply, whereby the granulate runs radially into the transport grooves. During this, a transport groove with the granulate is moved past an axial sealing lip that slows the metering cylinder down and increases the drive energy requirement. Here as well, the radial feed of material leads to precompaction with the consequences described above for metering accuracy and drive energy. Above the metering cylinder there is an axially movable cover that restricts the filling level of the grooves upwards. When travelling over uneven ground, such as occurs regularly in practice, this results in different material angles of repose that influence the filling level of the grooves and thus lead to inaccuracies in metering. With small delivery volumes in particular, bridge formation occurs on the follow-on of material from the storage container. The first publication of German patent DE 10 2005 052 741 A1 shows a cell wheel meter for a centrifugal spreader with a feed hopper that is located in the feed hopper and has at least one cell wheel through which the flow takes place axially in the flow direction of the feed hopper and can be driven by a controllable motor with different speeds. Here, the cell wheel volume can be changed in sandwich form by stacking several cell wheels. However, this is complicated to do and cannot be done without tools.

The task of the invention is to cancel out the above disadvantages, to provide an operationally reliable metering system that guarantees material inflow and outflow that is as even as possible, has a low drive torque requirement and enables a very high adjusting range for the metered material flow.

Continuous and bridging-free follow-on of the material that is being discharged into the cell chambers of the cell wheel is achieved through the practically vertical layout of the metering system and the cell wheel. The conveyed volume of the individual cell chambers can be adjusted in a simple way by adjusting the distance of the lower partition elements to the upper edge of the rib-like elements of the cell wheel. Through the rotating movement of the cell wheel a defined material volume leaves the area of the inlet opening and reaches the discharge opening, where it leaves the cell chambers through gravity and/or through centrifugal force and is passed on into the transport system.

In an improved form of the invention, the casing is designed in such a way that filling the cell wheel or the cell chambers with material takes place in a mainly axial direction or parallel to the axis of the cell wheel. Through the practically vertical feed of material into the cell chambers that results from the shape of the casing, the cell chambers are filled safely and completely on uneven ground as well or with high cell wheel speeds.

In a special form of the invention, the surfaces of the partition elements towards the cell chambers running from the axle of the cell wheel to the casing are designed bevelled or sloping downwards. The total and complete material discharge out of the cell chamber into the discharge opening is improved through this shape of the partition elements.

Another proposal provides that the rib-type elements of the cell wheel in the upper section are designed with practically the same or a parallel cross-section contour as the lower partition elements. With this shape, the height-adjustable partition elements enable the material volume flow to be adjusted from maximum flow rate to practically zero flow.

In another form of the invention form, the rib-type elements of the cell wheel are made at least partially from an elastic material. By using an elastic material, destruction of the cell wheel can be countered if foreign bodies penetrate into the metering system.

In a further form of the invention, the inlet opening is designed with one or more stripper edges or strippers that limit the infeed of material together with the rib-type elements of the cell wheel. The stripper edges or strippers define the filling level of material in the cell chamber and contribute to a constant material volume flow.

The efficiency of the invention can be improved if one or more stripper edges or strippers are designed to be flexible or are made from an elastic material. This can counteract premature wear of the cell wheel, the stripper edges or the strippers, which occurs in particular when abrasive material is dispensed, such as fertiliser broken into granulate.

In a special form of the invention, the partition elements are fitted at their upper outer edges with conveyor ribs or partial recesses. This shape of the partition elements enables them in their upper position in combination with the cell wheel to take over the function of a fine seed metering wheel for dispensing small amounts of small seeds or microgranulate.

It is also to be regarded as advantageous if the partition elements are designed to be displaceable by a motor or by hand in an axial direction to the cell wheel. This enables graduated or stepless adjustment of the volume conveyed. In addition, the use of motor adjusting elements enables remote actuation or connection to a control appliance.

In a compact form of the invention, part of the cell wheel is formed as a cavity that is designed to hold a drive motor. In this way, valuable space in the agricultural distributor is saved for arranging additional units.

In an even more advantageous form of the invention, the drive motor is designed as a drum motor with a fixed inside axle and a movable external housing. For example, use of a standard external electric rotor motor with an inside stator simplifies the construction and reduces the number of parts required.

It also proves to be expedient as well if the drive of the cell wheel is designed to be reversible in its direction of rotation. For example, by using different strippers in the inlet opening different metering characteristics of the metering system can be set that result, for example, with seeds or fertiliser as the material to be metered, or bridge formation on poor after running of material from the storage container can be countered.

In another form of the invention, the axle of the cell wheel has a thread and a threaded socket that are designed to adjust the partition elements in the axial distance to the upper edge of the rib-type elements. A simple and stepless facility for adjusting the height is created by using a threaded socket or a threaded nut, which are supported self-arresting against a thread at the lower end of the axle of the cell wheel.

In a practical form of the invention, one or more locking elements are located in the area of the threaded socket with which the threaded socket can be prevented for rotating at least temporarily. The threaded socket or the threaded nut can be locked by using a pin or a sash fastener. The partition elements can be moved up and down easily by turning or operating the cell wheel drive in different directions.

The locking element can also be remotely operated by means of a magnet or other actuators.

In a further form of the invention, the edge contour of the discharge opening is designed in such a way that a practically continuous material discharge takes place when the cell wheel is rotated. Improved discharge of material into the pneumatic conveyor system of the agricultural distributor is achieved by selecting a suitable outlet contour in the discharge opening of the casing. Bevelled, rounded or parabolic contours have proved to be particularly advantageous.

It is also conceivable for the drive of the cell wheel to be designed to continue into the area of the storage container or of the feed hopper to operate a stirring or loosening device. This layout makes it unnecessary to have an additional drive device for a stirrer. For example, stirrer fingers can be fixed to a shaft extension of the drive shaft above the metering system. A stirrer or a loosening or crushing device can prevent possible blockages in the subsequent material flow, in particular if gratings are arranged above the metering system to protect against foreign bodies or caked-on clumps of seeds or fertiliser.

In an automated form of the invention, a control appliance is allocated to the metering system that is designed to set or regulate the drive cell speed of the cell wheel or the adjustment of the lower partition elements with a program and set parameters. The control appliance can be a metering computer that, for example, controls the output quantity of the agricultural distributor, for example by means of the driving speed or the local conditions, by changing the speed of the cell wheel or varying the volume of the individual cell chambers by placing or changing the spacing between the partition elements. The required output quantity of material can be stored in a memory specifically for a part area or be determined locally through additional sensor technology. The control appliance can be connected to a display and control unit, which enables the operator to monitor or manipulate the function or the setting parameters of the metering system. An arrangement of several metering systems within an agricultural distributor is also conceivable to which a joint or separate storage container and a joint or several separate conveyor and distribution systems are allocated. In the process, a control appliance in the individual metering systems can set different volume flows, as described above, such as is necessary, for example, on setting tramline or part-width control of the distributor.

The invention is characterised in particular in that through the axial adjustability of the partition elements a metering system is created with a cell wheel that has height-adjustable floor elements. Along with the selection of different speeds for the drive of the cell wheel, an additional facility for setting the conveyed volume of the cell wheel and thus the volume flow of the material to be conveyed is created. In comparison to horizontal cell wheels, the torque for the drive of the cell wheel hardly changes with differently set conveyed volumes. Through the mainly axial inflow of material. In comparison to radial inflow with horizontal cell wheels, there is a much shorter and practically constant material shearing range when leaving the filled cell chamber from the inlet opening. This considerably reduces the drive energy requirement. Material compaction within the cell chambers, such as may be observed with horizontal cell wheels, in particular with radially feeding bottom valves, does not occur here either and reduces the drive energy requirement for the cell wheel in addition. In this way, the drive of the metering system can be realised as a compact, low-cost and energy-saving design. A separate fine seed metering wheel, with which the remaining cell wheel zone has to be out of operation with coupling elements, is no longer required either and can be done without.

BRIEF DESCRIPTION OF THE DRAWINGS

Further details and advantages of the object of the invention can be found in the following description and the associated drawings, which show an implementation example with the necessary details and individual parts.

DETAILED DESCRIPTION

Figure 1:
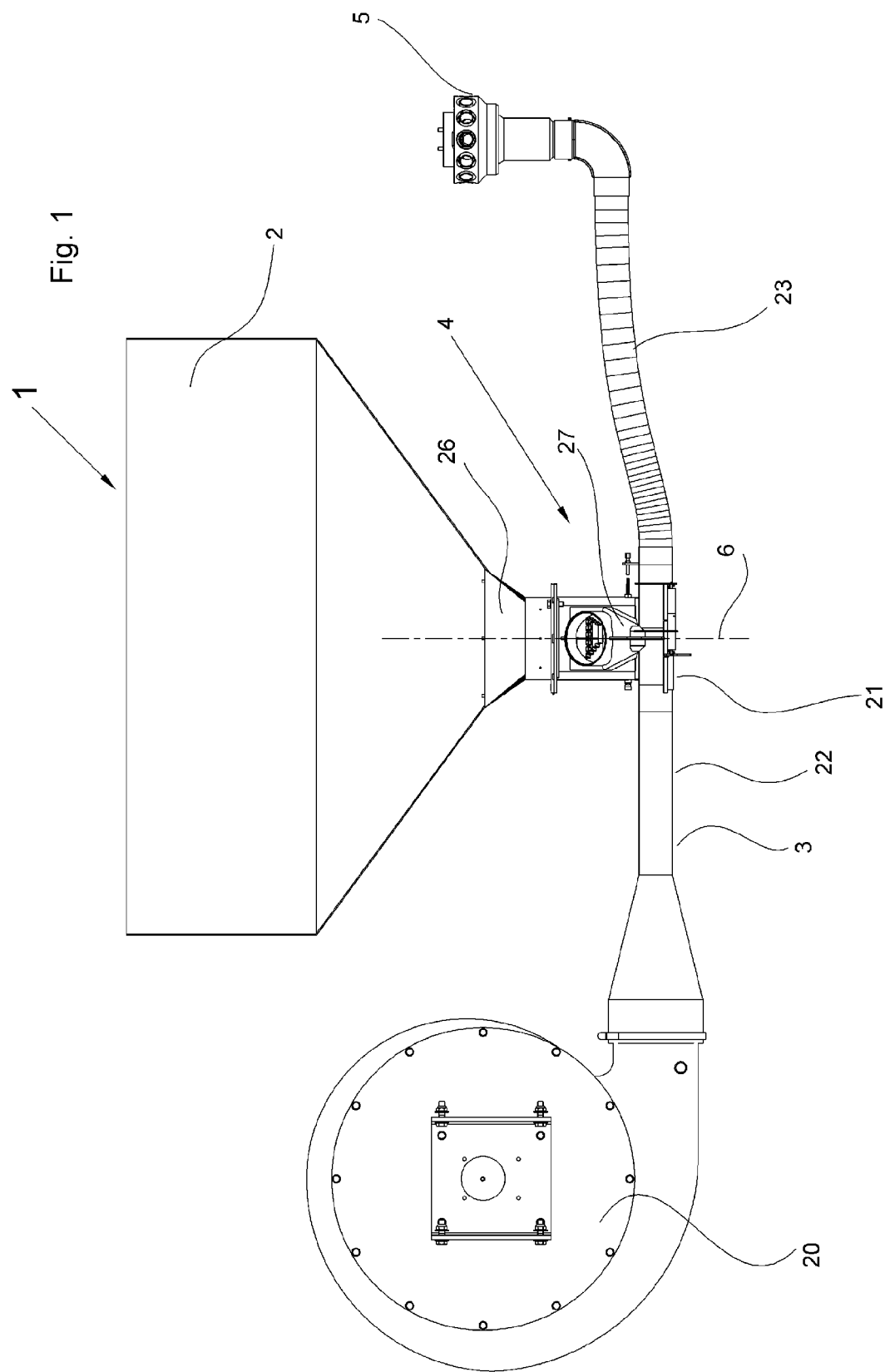
FIG. 1 Shows a schematic breakdown of an agricultural distributor.

The agricultural distributor 1 that is shown in principle in FIG. 1 consists of a storage container 2, to which one or more metering systems 4 are connected at the lower end. Thanks to the funnel or conical shape of the storage containers 2 in the bottom section, the free flowing material flows without residues via the feed hopper 26 into the metering system 4. A pneumatic transport system 3 is connected to the outlet of the metering device 4. The transport system 3 is supplied with an air stream via a blower 20 and the pipe 22. The air stream passes through an injector sluice 21, to which material from the metering system 4 is fed via the guiding element 27. From there, the material passes with the air stream via the feed pipe 23 into the distributing device 5. The distributing device 5 divides the material flow evenly and guides the part flows into sowing coulters or distributor nozzles, for example, which are not shown further.

Figure 2:
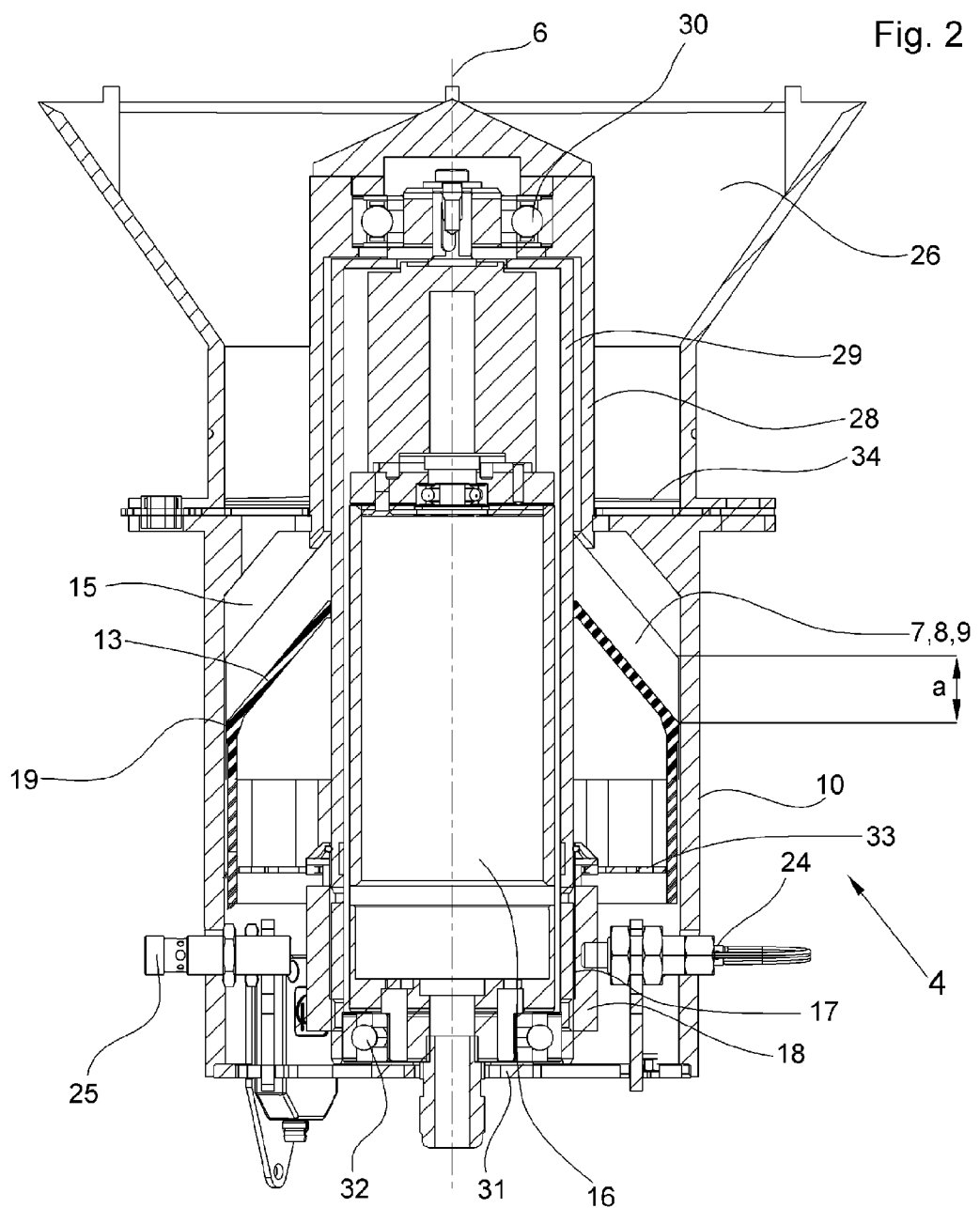
FIG. 2 Shows a vertical section through the structure of the metering system, FIG. 3 Shows a vertical section through the structure of the metering system in perspective view, and FIG. 4 Shows a perspective view into the inlet area of the metering system.

FIG. 2 shows a cross-section through the metering system 4, as can be seen in the same view in FIG. 1. Free flowing material flows from above into the feed hopper 26. A top-sealed support tube 28 is installed in the feed hopper 26 that takes over the support 30 for the cell wheel that is rotatable around the axle 6. The casing 10 connects to the feed hopper 26 in the form of a jacketed pipe in a flanged construction. A movable rotary slide 34 in the form of a metal segment is inserted in the flanged connection. The flow of material can be limited or prevented with this, in order to carry out maintenance or adjusting work on the metering system 4, for example. The cell wheel 7 consists of an inner pipe 29 that forms the rotating axle 6 and the radial inside walls of the cell chamber 9. From the inner pipe 30, eight rib-type elements 8 stretch in equal pitch outwards and seal in a narrow gap against the fixed casing 10. Different volumes of the cell chambers 9 can be achieved through a different number of rib-type elements 8 or their shape. Two of the strippers 15 are fastened on the casing right and left of the axle 6 above the rib-type elements 8. The rib-type elements 8 rotating around the axle 6 come into contact with the strippers 15 or form a sealing gap with these. The conical limiting element 13 is pushed from below over the inner pipe 29. The partition element 13 is designed in one piece and slit in the area of the rib-type elements 8 and forms sealing gaps with these. A multi-part design of the partition elements 13 is conceivable, for example with shearing wedges. The axially displaceable partition element 13 forms the lower limit of cell chamber 9 and defines its volume. Here, the distance a can be adjusted from 0 mm (practically zero feed) up to the maximum length of the rib-type elements 8, as long as the impermeability of the cell chambers 9 remains guaranteed. A drive motor 16 in the form of an electromotor is slid into the inner pipe 29, which forms a cavity of the cell wheel 7, and supported in the inner pipe 29 on an additional bearing 32 in the inner pipe 29. The bearings 30, 32 are designed as maintenance-free ball bearings. Other bearing types are possible as well, for example slide bearings. The drive motor 16 drives the hub of the inner pipe 29 in the upper section via a disk with a feather key. The housing of the drive motor 16 is permanently connected to the casing 10 via one or more support plates 31. There is a thread in the bottom section of the inner pipe 29 onto which a threaded socket 18 is screwed. The partition element 13 engages by means of one or more rib plates 33 in a circumferential groove of the threaded socket 18. The position (a) of the partition elements 13 can thus be adjusted by turning threaded socket 18 on the thread 17 in one direction or the other. If the thread 17 is self-locking, other safeguards against unintentional adjustment are not required. If the threaded socket 18 is temporarily fixed against turning with a locking element 24 fixed towards the casing 10, the inner pipe 29 and thus the thread 17 can be turned in one direction or the other by actuating the drive motor 16 and this slides the threaded socket 18 and the partition element 13 as well in the required direction. The metering volume can be adjusted from outside or even during operations of the metering system 4 through remote actuation of the locking element 24. In addition, remote actuation of the locking element 24 and control of the drive motor can be carried out by a control appliance, in order to automate the control of the material discharge volume further. A sensor 25 is located in the casing 10 opposite the locking element 24. This can be used to monitor the movement of the cell wheel 7 or its actuators. The signals are supplied to a control appliance.

Figure 3:
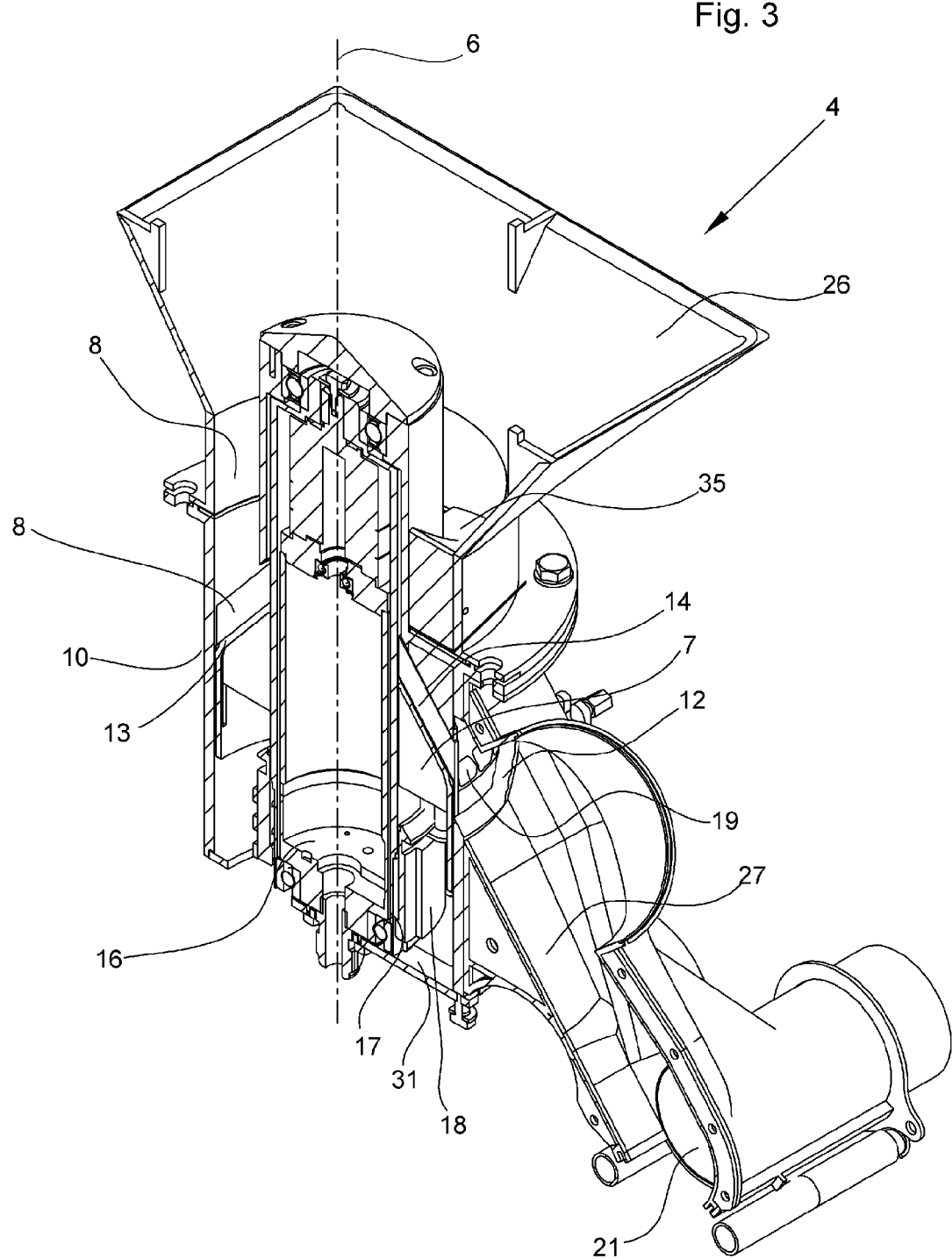

In comparison with FIG. 2, the cross-sectional diagram of the metering system 4 in FIG. 3 is shown turned around axle 6 by 90°. The references and the structure have already been largely described in FIG. 2. Half of a slanted form element 35 is shown in the feed hopper 26 that prevents material being fed from above into cell wheel 7 in the area of the discharge opening 12. The area not covered by the form element 35 on the opposite side of the axle 6 or of the inner pipe 29 forms the inlet opening 11 for feeding material into the cell wheel 7 or into the cell chambers 9 that are open in this area. The upper circumferential slant of the form element 35 enables full and complete discharge of material into the inlet opening 11. When material is filled into the storage container 2 or the feed hopper 26, the cell chambers 9 that are in the inlet opening are filled with material up to the lower partition element 13. The drive motor 16 moves the cell wheel 7 in continuous rotation around the axle 6 and moves the filled cell chambers 9 past the strippers 15, which cannot be seen here, into the area of the discharge opening 12. The strippers 15, which were already described above, restrict the degree of filling of the cell chambers 9 with material. If a rib-type element 8 of the cell wheel 7 passes the edge contour discharge opening 12, the material flows through gravity and/or centrifugal force through the guiding element 27, half of which is shown here, into the injector sluice 21, where it is collected by the air stream of the pneumatic transport system 3 and, as described above, conveyed further. If the lower partition element 13 is moved into the uppermost position, the cell chambers 9 of the cell wheel 7 are closed, with the exception of the recesses 19. Only the recesses 19 are still effective as smaller subdivided transport cells and enable the finest metering of small seeds or microgranulate.

FIG. 4 shows a perspective view of the metering system reduced to casing 10, cell wheel 7 and support tube 28 towards the inlet opening 11. The form element 35 covers the area of the discharge opening, which cannot be seen, in the casing 10 as against the inlet opening 11. Through the circumferential slant of the form element 35 the material found on it slides through gravity into the inlet opening 11. The inlet opening 11 can be closed off by the rotary slide 34, which is shown here completely open. The other, closed, half of the rotary slide is covered by the form element 35 and can be moved by rotating the rotary slide over the inlet opening 11. The strippers 15, 15', which limit the level to which the cell chambers 9 are filled with material, can be seen to the right and left of the support tube 28. The strippers 15, 15' can be fixed either on the structure of the casing 10 or of the form element 35. The alignment of the surface 14 of the partition element 13 to the upper edge of the rib-type element 8 can also be recognised, which in turn corresponds or is aligned with the bottom edge of the strippers 15, 15'. Covered by the slide 34, the recesses 19 in the upper edge area of the partition element or partition elements 13 are located in the proximity of the casing 10. The inlet area 11 here stretches over about four visible cell chambers 9, which, with four more concealed cell chambers, divide the cell wheel 7 evenly be means of the rib-type elements 8. Other divisions or sizes of the inlet opening are conceivable as well.

The invention claimed is:

1. Agricultural distributor (1) for dispensing granular or granulated material from at least one storage container to at least one distributing device, comprising at least one storage container (2) for metered delivery to a pneumatic transport system (3) and of at least one distributing device (5) connected to the pneumatic transport system (3), whereby the metering system (4) is allocated at least one driven cell wheel (7) rotating around a practically vertical axle (6) from which axle (6) several rib-type elements (8) stretch to the outside around the circumference of the cell wheel (7) and form the cell chambers (9) that divide the cell wheel (7), whereby the respective cell chambers (9) are limited at the side by a casing (10) reaching to the perimeter of the cell wheel (7), whereby an inlet opening (11) for the inflow of material into the cell chambers (9), which stretches in its profile over at least one partition of the cell wheel (7) or a cell chamber (9), is formed above the cell chambers (9) in the upper section of the metering system (4), whereby the casing (10) of the cell wheel (7) at the side and approximately opposite to the inlet opening (11) of the storage containers (2) has a discharge opening (12) that stretches in its profile at the perimeter of the casing (10) and at least over one partition of the cell wheel (7) or a cell chamber (9), whereby the discharge opening (12) for the material discharge is connected at least indirectly with the pneumatic transport system (3), whereby the inlet opening (11) and the discharge opening (12) are formed in such a way that at least one partition of the cell wheel (7) or a cell chamber (9) separate the inlet opening (11) and the discharge opening (12) from one another, wherein the volumes of the cell chambers (9) in the lower section of the cell wheel (7) are defined or limited by one or more partition elements (13) movable in an axial direction to the cell wheel (7), whose axial distance (a) to the upper edge of the rib-type elements (8) is designed to be adjustable.

2. Agricultural distributor in accordance with claim 1, wherein the casing (10) is formed in such a way that the cell wheel (7) or the cell chambers (9) are filled with material mainly in an axial direction or parallel to the axle (6) of the cell wheel (7).

3. Agricultural distributor in accordance with claim 1, wherein the surface (14) of the partition elements (13) facing the cell chambers (9) is designed sloping or slanting running downwards from the axle (6) of the cell wheel (7) to the casing (10).

4. Agricultural distributor in accordance with claim 1, wherein the rib-type elements (8) of the cell wheel (7) are formed in the upper section with an approximately identical or parallel contour to the lower partition elements (13).

5. Agricultural distributor in accordance with claim 1, wherein the rib-type elements (8) of the cell wheel (7) are formed preferably at least partly from an elastic material.

6. Agricultural distributor in accordance with claim 1, wherein the inlet opening (11) is formed with one or more stripper edges or strippers (15) that are located to limit the inflow of material together with the rib-type elements (8) of the cell wheel (7).

7. Agricultural distributor in accordance with claim 6, wherein one or more stripper edges or strippers (15) are designed to be flexible or are made from an elastic material.

8. Agricultural distributor in accordance with claim 1, wherein the partition elements (13) are provided with conveying ribs or partial recesses (19) at the upper, outer or inner edges.

9. Agricultural distributor in accordance with claim 1, wherein the partition elements (13) are designed to be movable to the cell wheel (7) in an axial direction manually or by a motor.

10. Agricultural distributor in accordance with claim 1, wherein a part of the cell wheel (7) is formed as a cavity that is designed to hold a drive motor (16).

11. Agricultural distributor in accordance with claim 10, wherein the drive motor (16) is implemented as a drum motor with a rigid internal axle and a movable external housing.

12. Agricultural distributor in accordance with claim 1, wherein the drive of the cell wheel (7) is designed to be reversible in its direction of rotation.

13. Agricultural distributor in accordance with claim 1, wherein the axle (6) of the cell wheel (7) is formed to adjust the partition elements (13) with a thread (17) and a threaded socket (18) in the axial distance (a) from the upper edge of the rib-type elements (8).

14. Agricultural distributor in accordance with claim 13, wherein one or more locking elements (24) are arranged in the area of the threaded socket (18) with which the threaded socket (18) is locked in its rotation at least temporarily.

15. Agricultural distributor in accordance with claim 1, wherein the drive of the cell wheel (7) is designed to continue into the area of the storage container (2) or of the feed hopper (26) to operate a stirring or loosening device.

16. Agricultural distributor in accordance with claim 1, wherein a control appliance is allocated to the metering system (4) that is designed to set or control the drive speed of the cell wheel or the setting of the lower partition elements with a program and stored parameters in dependence on a measured drive speed.

* * * * *